No. 658,440. Patented Sept. 25, 1900.
F. B. HASSENSTAB.
SUGAR BEET SEED PLANTER.
(Application filed Apr. 13, 1900.)

(No Model.) 2 Sheets—Sheet 1.

Witnesses:
L. E. Wickman
H. L. Thauwald

Inventor:
Francis B. Hassenstab
by: Stryker & Bradbury
Attorneys.

THE NORRIS PETERS CO., PHOTO-LITHO., WASHINGTON, D. C.

No. 658,440. Patented Sept. 25, 1900.
F. B. HASSENSTAB.
SUGAR BEET SEED PLANTER.
(Application filed Apr. 13, 1900.)

(No Model.) 2 Sheets—Sheet 2.

Witnesses:
L. E. Wickman
H. L. Thauwald

Inventor:
Francis B. Hassenstab.
by: Stryker & Bradbury
Attorneys.

UNITED STATES PATENT OFFICE.

FRANCIS B. HASSENSTAB, OF YOUNG AMERICA, MINNESOTA.

SUGAR-BEET-SEED PLANTER.

SPECIFICATION forming part of Letters Patent No. 658,440, dated September 25, 1900.

Application filed April 13, 1900. Serial No. 12,667. (No model.)

*To all whom it may concern:*

Be it known that I, FRANCIS B. HASSENSTAB, a citizen of the United States, residing at Young America, in the county of Carver and State of Minnesota, have invented certain new and useful Improvements in Sugar-Beet-Seed Planters, of which the following is a specification.

My invention relates to improvements in sugar-beet-seed planters. Its object is to plant a uniform number of seeds at regular intervals.

My invention consists of a hopper, a feed-disk entering its side, recessed so as to receive the seed, and drive mechanism for revolving the disk. When in operation, the recesses are adapted to hold a prearranged number of seeds and to carry them from the hopper and drop them into a drill through which they are planted at uniform distances apart.

Figure 1:
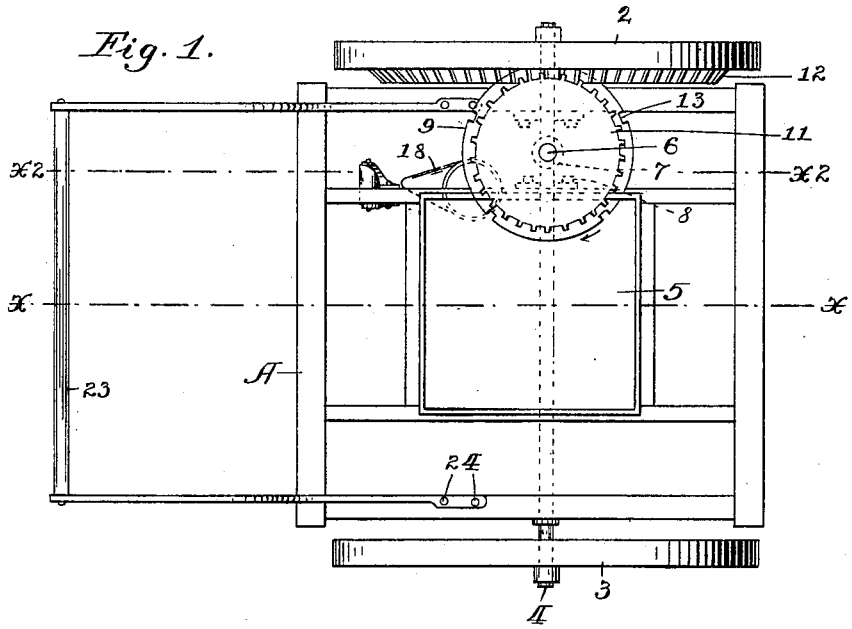
Figure 2:
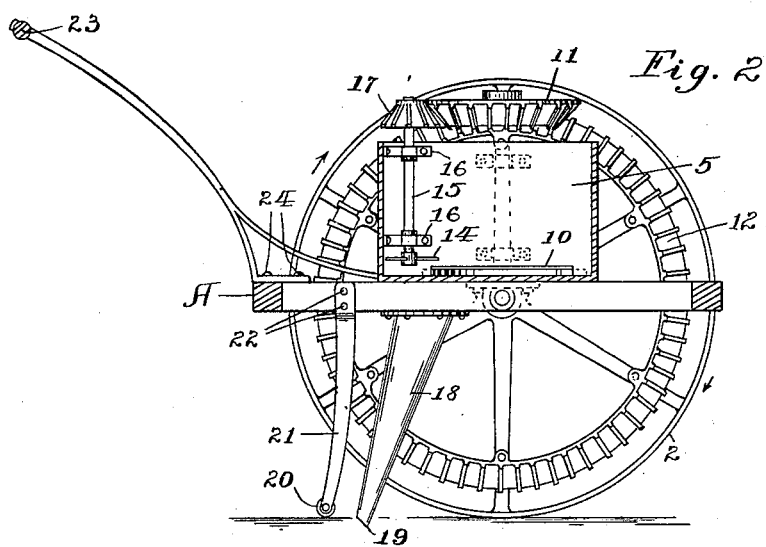
Figure 3:
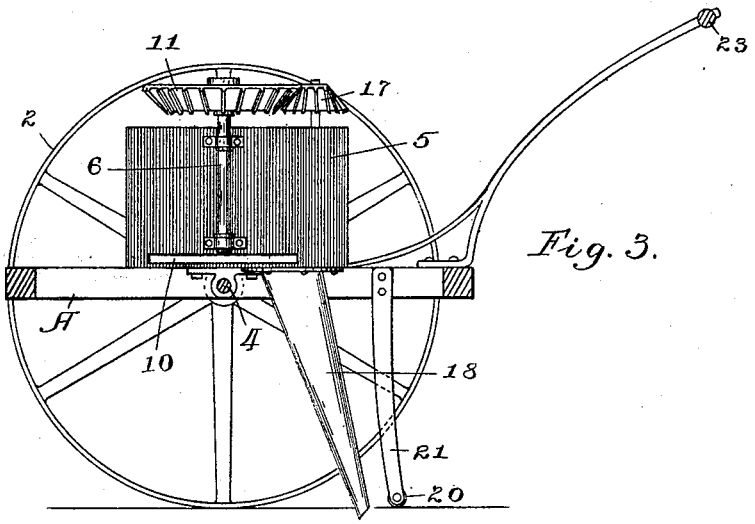
Figure 4:
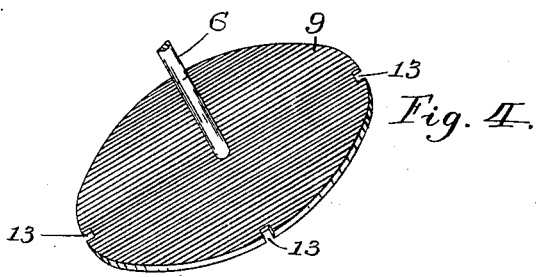

In the accompanying drawings, forming part of this specification, Figure 1 is a plan view of my improved sugar-beet-seed planter for use by hand. Fig. 2 is a section of Fig. 1, taken on the line X X. Fig. 3 is another section, taken on the line $X^2 X^2$; and Fig. 4 is a perspective view of the disk used for feeding the seed from the hopper into the drill.

In the drawings, A represents the framework, which is carried by wheels 2 and 3, journaled upon axle 4. The frame carries the seed-hopper 5, which, as shown, is rectangular in shape. Adjoining the hopper is the vertical shaft 6, which is journaled in brackets 7. The brackets are fastened to the hopper by bolts 8. The shaft carries the seed-disk 9, which extends through the slot 10 laterally into the hopper. The shaft also carries the bevel-gear 11, which meshes with bevel driving-gear 12, mounted on wheel 2. The disk is notched at 13 for the purpose of admitting the seeds and feeding them from the hopper at prearranged intervals. The slot in the hopper is of suitable size, so that the disk fits snugly and prevents the seeds from creeping out when the machine is in operation.

An agitator 14 is provided to prevent clogging of the seeds in the hopper. The agitator is carried by the vertical shaft 15. This shaft is journaled in brackets 16, mounted upon the hopper, and carries bevel-pinion 17, which meshes with the gear 11. As the machine is moved forward the wheels revolve in the direction indicated by the arrows in Fig. 2 and revolve the disk by means of the gearing, so as to feed the seed into the hollow drill 18 from the hopper. This drill is carried by the frame A and depends therefrom. Its point 19 is adapted to open the ground, so that the seed fed from the hopper pass into the opening. The roller 20, journaled in the hanger 21, follows behind the drill and covers the seeds as they drop into the ground from the drill. The hanger is fastened to the frame by bolts 22.

The machine is provided with the handle 23, which is fastened to the frame by bolts 24. A disk with any desired number of notches may be used for feeding the seed, and its size may be varied, so as to plant the seed at the desired distance apart. The size of the notches in the disk may be varied, so as to hold as many seed as each hill is to contain.

In operation the machine is propelled by hand, so as to revolve the wheels. Motion is transmitted to the disk by the driving mechanism, consisting of the gears 11 and 12. The seed enter the notches in the disk and are carried out of the hopper by the disk as it revolves. They then drop into the hollow drill and enter the opening in the ground made by its point. The roller 20, following the point, covers the earth over the seed. The agitator 14 revolves by the pinion 17 and prevents the seed in the hopper becoming clogged.

Having described my invention, what I claim as new, and desire to protect by Letters Patent, is—

1. A sugar-beet-seed planter, consisting of a hopper; a feed-disk entering the side of said hopper, notched to receive the seed; means for operatively connecting said disk to the drive-wheel; a hollow drill carried below the hopper to receive the seed from the hopper through the disk and deposit them in the earth, and a roller positioned to follow after the drill.

2. A sugar-beet-seed planter, consisting of a hopper, an agitator in the hopper, a feed-disk entering the side of said hopper, notched to receive the seed, drive mechanism for the agitator and disk, and a hollow drill carried below the hopper to receive the seed from the hopper through the disk.

3. A sugar-beet-seed planter, consisting in combination, of a slotted hopper; a revoluble disk entering its side through said slot, said disk having notches in its periphery; means for revolving said disk; a frame supporting said parts, and wheels upon which the parts are carried and by which they are driven.

4. A sugar-beet-seed planter, consisting in combination, of a hopper; a revoluble disk having openings to receive the seed; means for revolving said disk as the seeder is propelled; said hopper having a slot in its side through which the disk projects laterally; a hollow drill positioned below the hopper, adapted to receive the seed as it is fed from the hopper; a roller positioned behind the drill and a frame for supporting said parts.

5. A machine of the class described, consisting of a journaled feed-disk, notched to receive the seed, a hopper having a slot through which said disk enters its side and carrying an agitator adjoining the disk, drive mechanism for the disk and agitator, and a frame for carrying said parts.

6. A sugar-beet-seed planter, consisting of a slotted hopper, a journaled disk entering its side through said slot, said disk having notches in its periphery, a journaled agitator adjoining the disk in the hopper, mechanism for revolving the disk and agitator, a hollow drill positioned below the disk, and a frame for supporting said parts.

7. A machine of the class described, consisting of a hopper 5, a journaled disk 9, having openings to receive the seed, an agitator 14 in the hopper, drive mechanism for propelling the disk and agitator; said hopper having a slot 10, in its side through which the disk projects and adjoining which the agitator is positioned, a drill 18 carried below the hopper, adapted to receive and plant the seed as it is fed from the machine, and a frame for supporting said parts.

In testimony whereof I have signed my name to this specification in the presence of two subscribing witnesses.

FRANCIS B. HASSENSTAB.

Witnesses:
L. E. WICKMAN,
F. G. BRADBURY.